United States Patent [19]  
Sloan

[11] 3,930,068  
[45] Dec. 30, 1975

[54] METHOD FOR SEALING LEAKS IN RIGID HOLLOW ARTICLES

[76] Inventor: Samuel Sloan, 13011 Old Stage Coach Road, Laurel, Md. 20811

[22] Filed: May 23, 1973

[21] Appl. No.: 362,883

[52] U.S. Cl. .................. 427/140; 106/33; 106/195; 138/99; 156/94; 264/36; 427/142
[51] Int. Cl.² .......................................... B32B 35/00
[58] Field of Search...... 117/94, 95, 97, 2 R, 161 C; 138/97, 99; 106/33, 195; 156/94; 264/36; 427/141, 142

[56] References Cited
UNITED STATES PATENTS

| | | | |
|---|---|---|---|
| 2,175,373 | 10/1939 | Baker..................... | 117/95 |
| 2,882,181 | 4/1959 | Hoffman.................. | 117/2 R |
| 2,895,844 | 7/1959 | Bader et al. ............. | 106/195 |
| 2,950,992 | 8/1960 | Brillhart et al........... | 106/195 X |
| 3,076,718 | 2/1963 | Gearhart et al.......... | 106/180 |
| 3,087,835 | 4/1963 | Auer..................... | 106/195 X |
| 3,393,087 | 7/1968 | Kamp et al. ............ | 117/94 X |

OTHER PUBLICATIONS

Websters Dictionary, 3rd New International Dictionary Unabridged, C & C Merriam Co., Publishers, Springfield, Mass. p. 1261.

Primary Examiner—Edward G. Whitby
Attorney, Agent, or Firm—Stanley D. Schwartz

[57] ABSTRACT

A method for repairing rigid, hollow articles, e.g., gas tanks, having a local fluid permeable discontinuity or leak therein. The method comprises spreading over the leak a composition comprising a fluid mixture of lacquer comprising nitrocellulose and preferably, a sufficient amount of plasticizer to impart flexbility to said composition.

1 Claim, No Drawings

METHOD FOR SEALING LEAKS IN RIGID HOLLOW ARTICLES

BACKGROUND OF THE INVENTION

Until recently, when damage or other imperfection occurred in some part of a container or tank, e.g., a gas tank on a motorcycle, there was no simple and satisfactory method available for the rapid repair, of even a temporary nature, short of either replacing the damaged hollow article or sealing the discontinuity or crack by means of a welding process. Accordingly, the need for being able to repair a liquid permeable discontinuity in a hollow article, e.g., a gas tank, pipe, etc., in a simple and efficient manner without having to remove the contents from said hollow article has existed for a long time.

OBJECTS OF THE INVENTION

It is therefore a significant object of this invention to provide a method for the quick and efficient repair and reconstruction of a hollow article, e.g., a gas tank, which contains a local fluid permeable discontinuity or crack.

An important further object of the present invention is to provide a method for sealing a local fluid permeable discontinuity or leak without the necessity of having to remove a fluid from a hollow article, e.g., gas tank, during the repair operation.

It is also an object of this invention to provide a new method for sealing local fluid permeable discontinuities or leaks in containers and/or conduits wherein the repaired article can be promptly restored to service and does not require further attention over a long or even indefinite period of time.

A still further object is to provide a new process for treating a container having a fluid material therein, with a coating that is hard and tough over the local fluid permeable discontinuity as well as to provide an economical and highly efficient process for achieving this and all of the objects set forth herein.

These and other objects of the present invention will become apparent during the course of the following description and appended claims.

BRIEF DESCRIPTION OF THE INVENTION

It has now been discovered that these and other objects may be accomplished by the process of the invention which first comprises the step of applying to a local fluid permeable discontinuity a composition comprising a fluid mixture of lacquer comprising nitrocellulose and a sufficient amount of plasticizer, when preferred, to impart flexibility to the composition and thereafter permitting the composition to dry, the drying step taking a very short period of time, e.g., 30 seconds.

DETAILED DESCRIPTION OF THE INVENTION

It has now been found that, by the use of this process, one can easily apply a durable coating to rigid, hollow articles which are either filled with a material, e.g., a liquid material such as gasoline, or an otherwise empty article. The application is particularly efficient when applied to surfaces while they contain a fluid material therein, such as gasoline, without having to remove the same from therein in order to repair the hollow article. The coating has excellent adhesion characteristics to both metal and non-metal surfaces. In addition, the coatings have sufficient elasticity, a low shrinkage factor and a high specific adhesion, as well as providing resistance to moisture and solvents, e.g., gasoline. In view of these totally unexpected properties of the compositions used in this invention, it is now possible to repair leaks in rigid, hollow articles, such as gas tanks on motorcycles, without having the motorcycle out of service for a long period of time as well as being able to facilitate the immediate replacement of the motorcycle back into service by means of a simple and efficient process and at a fraction of the cost and time otherwise required by prior art procedures.

The nitrocellulose used in the practice of this invention, and formed by the direct nitration of cellulose with nitric acid, is present in the composition in an effective amount for sealing the liquid permeable discontinuity. Generally, the composition contains at least about ten percent by weight of said nitrocellulose in the composition and preferably between about 10 to 15 weight percent.

Plasticizers may be used to impart flexibility to what otherwise would be excessive coating brittleness, usable plasticizers including castor oil, organic tartarates, organic phosphates, phthalates, camphor and benzoates. The preferred amount of plasticizer used in this invention is about 3 percent by weight of the composition.

The colorless lacquer used in the practice of this invention is preferably of the resin-base type. Exemplary of the synthetic resins which may be used for this purpose are: polyvinyl acetate, polyesters, aryl sulfonamides, ethyl cellulose, cellulose acetate butyrate, cellulose acetate, polyvinyl, polyvinyl formal, glyceryl phthalate and methyl methacrylate. The following natural resins have also been found satisfactory: dammar, mastic, sandarac, benzoin and rosin. The solvent phase of the lacquers prepared from one or more of these or similar resins, all of which are well known in the art, may be any suitable solvent. For example, acetone, acetic acid, ethyl acetate, dioxane, pyridine, ethanol and tetrachloroethane have been found satisfactory.

Generally, the lacquer portion of the composition consists essentially of between about 7 and 8 parts by weight of solvent per part of resin. Preferably, the composition contains between about 75 to 77 percent solvent and between about 7 and 10 percent of said resin.

Other materials may also be included in carrying out the process of this invention. Materials which are particularly desirable for use include conventional fibers without undesirably thickening the composition. For example, nylon fibers can be added in an amount of from 0.1 to 5 percent by weight of the composition.

ILLUSTRATIVE EXAMPLE

A gasoline tank which has developed a leak was initially cleaned about the area of the leak to remove all foreign material thereon. A composition comprising the following ingredients was applied over the location of the leak:

|  | parts by weight |
|---|---|
| Nitrocellulose | 12.5 |
| solvent | 76.5 |
| dibutyl phthalate (plasticizer) | 3.0 |
| resin (natural or synthetic) | 10.0 |

It will be appreciated by those skilled in the art that the choice and amount of the various components of the composition used in the invention will be subject to adjustment and correlation and will also depend upon the amount of nitrocellulose employed as well as any other optional ingredients that may be present in the compositions.

Having now discussed in considerable detail, illustrative and preferred embodiments of the invention, it should be apparent that the objects as set forth at the outset of this specification have been satisfied.

Accordingly, what is claimed is:

1. A method of repairing a rigid, hollow article useful for containing a fluid material therein, having one or more local fluid permeable discontinuities therein, comprising spreading over each of said discontinuities and the outer surface of said hollow article immediately adjacent to said discontinuities a composition consisting essentially of 12.5 parts by weight nitrocellulose, 76.5 parts by weight of an inert solvent, 10.0 parts by weight of a natural or synthetic resin, and 3.0 parts by weight of dibutyl phthalate.

* * * * *